April 15, 1947.  R. W. RAITT  2,418,953
TRANSDUCING SYSTEM
Filed Feb. 25, 1941  2 Sheets-Sheet 1
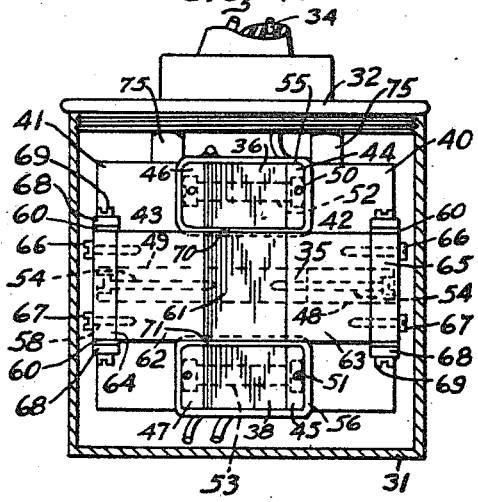
INVENTOR
*Russell W. Raitt*
BY *Philip Subkow*
ATTORNEY.

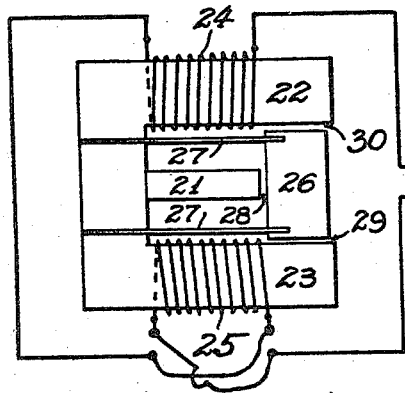
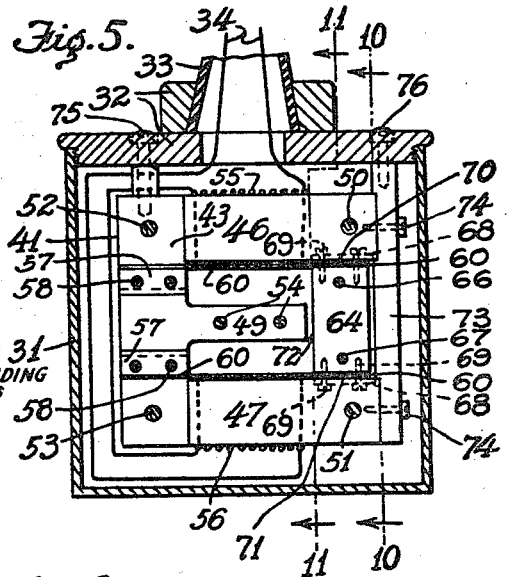
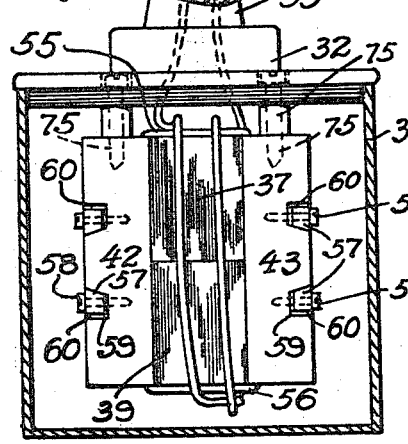
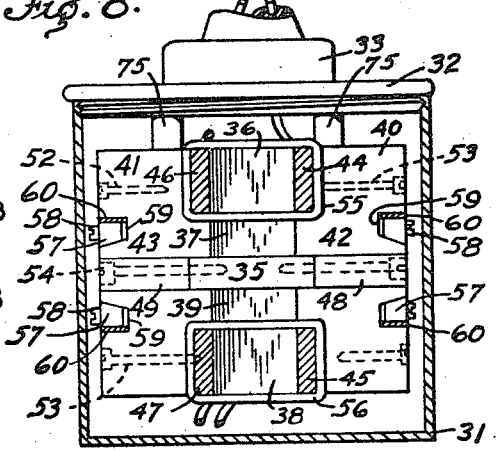

Patented Apr. 15, 1947

2,418,953

UNITED STATES PATENT OFFICE 2,418,953

TRANSDUCING SYSTEM

Russell W. Raitt, Altadena, Calif., assignor to Geophysical Engineering Corporation, Pasadena, Calif., a corporation of Delaware Application February 25, 1941, Serial No. 380,499

5 Claims. (Cl. 177—352)

This invention relates to improvements in transducing systems. A transducing system may be defined as composed of two mutually coupled dynamic systems, one mechanical and one electrical. In such system there is a transfer of energy from one of the systems to the other. This is well known in this art. The particular type of transducing system with which this invention is concerned is one in which transient or periodic forces imposed on one of the systems is faithfully transferred to the other. When the force applied is of periodic nature, and especially if the wave motion be composed of a number of superimposed motions of various periodicity, the response of the driven system must be faithful to the various applied periodicities.

Such transducing systems find various applications in the arts. Thus, if the driving force is electrical and the driven force mechanical, such a system may be an oscillograph, loud speaker or other signalling device. Where the applied force is mechanical and the applied transient or periodic mechanical force is translated into a transient or periodic electrical force, the system may be a seismometer or other geophone or an electrical phonograph pickup or an oscillograph. Many other uses will suggest themselves to those skilled in the art.

The application of my invention is best illustrated by a seismograph, although it is not limited thereto. I have, however, found that in applying my invention to a seismograph I have been able to greatly improve such instrument. Seismographs have become of great value in their application to geophysical exploration. Fundamentally a seismograph is composed of a case and a mass known as an inertial reactor, and an energy transfer system. The mechanical system of the seismograph, which is composed of an inertial mass yieldably suspended, usually on a spring suspension, is set in motion by the arrival of the ground disturbance or wave. The necessary criteria for such a system in order to permit accurate record of the characteristics of the ground disturbance, are (a) sensitivity, (b) damping, and (c) stability.

In this specification I have employed the C. G. S. (i. e. centimeter, gram, second) system of nomenclature and units.

Sensitivity may be termed to be not only the efficiency of the system in translating the input energy into output energy, but the term also includes the requirement that the system respond to and translate very low energy inputs into a readily detectable form in the output section of the system.

It is therefore one object of my invention to devise a highly sensitive transducing system.

Since in the use of the systems of my invention transient or periodic forces are imposed and it is desired that they be faithfully and recognizably translated in the output circuit, I have found it desirable that the system be highly damped but not necessarily critically damped. In my invention I desire to cause this damping by electromagnetic means.

It is therefore another object of my invention to devise a sensitive transducing system which is highly but not necessarily critically damped.

The general form of my preferred system, particularly as embodied in a seismometer, is composed of a permanent magnet, a gap or gaps and an armature. A sprung mass is interposed in the magnetic circuit. This may be the magnet or the armature or an independent mass forming part of the magnetic circuit. The mass cooperating with the rest of the magnetic circuit presents a gap or a plurality of gaps in the circuit. The displacement of the mass causes the gaps to change either in area or in length, and thus in reluctance, and this reluctance change causes a change in the flux through the armature and therefore induces a current in the coil. This current in passing through the resistances of the recording circuit or other circuit where this electrical energy is utilized causes the energy of the current to be converted into heat or into some other irreversible state. This energy is consumed at the expense of the energy imparted to the sprung mass by the transient or periodic force which displaces it.

When such a force is imposed on the sprung mass it deflects this mass from rest and stores potential energy in the springs. This energy is available for continued oscillation of the mass and would be so used except for the fact that part of this energy is translated into current which is induced in the electromagnetic circuit of the system. The degree of damping, that is, the rate of dissipation of the potential energy whereby the oscillations are damped depends upon the magnitude of this induced current. I have found that the degree of electromagnetic damping which can be obtained, particularly in such a system in which the gaps vary in reluctance due to their variation in length, will depend upon the ratio of the flux caused by the permanent magnet system when the sprung mass is at rest to the stiffness of the springs of the sprung mass. I have found that the magnetic force of the system acting across the gap acts in a manner which may for descriptive purposes be termed a negative spring stiffness. That is, it acts as if it were a spring opposing the action of the mechanical springs of the sprung mass. This is particularly true during the minute displacements caused by the minute earth movements to which the sprung mass is exposed, while acting as a seismometer. During these displacements, in close analogy with a mechanical spring acting according to Hook's law, the magnetic force which opposes the mechanical force of the deflected spring and therefore opposes the return of the mass to rest varies substantially linearly with the displacement.

The mechanical spring constant of the spring of the sprung mass has therefore an analogy in the magnetic stiffness of the magnetic field. I have found that in order to get a desirable amount of electromagnetic damping, particularly when the electrical circuit has a resistance load, that the ratio of this magnetic spring constant to the mechanical spring constant should be about equal to or exceed two-thirds.

I have found that as this relationship varies so that the magnetic spring constant becomes a larger fraction of the mechanical spring constant, the system enters a region wherein it becomes more nearly critically damped and when it becomes substantially, but not necessarily exactly equal, to the spring constant, it becomes a critically damped instrument.

It is therefore an object of my invention to devise an electromagnetic variable reluctance type of transducing system in which the reluctance varies as a result of the motion of a sprung mass and in which the magnetic spring constant bears such a relationship to the mechanical spring constant that the system will be highly but not necessarily critically damped.

In the systems of my invention it is desirable that the sprung mass, after being displaced from rest position, return to rest. If such a system may do so, even though the sprung mass be displaced to a degree sufficient to close the gap, the instrument may be said to be completely stable. The magnetic force across the gap introduces an element of instability in the system. It sets a limit on the degree of motion of the mass from which it can return to rest. If the motion of the mass exceeds such limit instead of returning to rest it will be attracted to the opposing face of the magnet system and will not return to rest. Indeed the system may be so completely unstable that the mechanical springs cannot hold the mass in the zero or rest position and the mass will fly to the pole piece. Such a system is completely unstable.

I have found that when the flux in the permanent magnet system is increased in order to get an amount of magnetic stiffness to give the desirable damping, the magnetic force across the gap is increased to an amount so that the inertial mass is attracted to the pole piece of the magnet. The greater the magnitude of the flux and the greater the degree of damping the less stable the instrument. When the system has such a ratio of magnetic stiffness to spring stiffness so as to give critical damping, the system becomes completely unstable.

I have discovered that this inherent instability may be corrected and overcome by a proper control of the internal and external reluctances of the magnetic circuit. I have found that the magnetic stiffness may be varied by varying the ratio of the internal to the external reluctance. As this ratio is increased, the magnetic stiffness decreases and the magnitude of the magnetic force operating at such displacement, to overcome the tendency of the spring to return the mass to zero, is diminished. I have found that for any given ratio of the magnetic stiffness constant to the spring stiffness there is a ratio of the internal reluctance to external reluctance which if met or exceeded will give a desirable stability.

I have also found that with the proper magneto-motive force in the permanent magnet, and proper design of external reluctance, I can, by a proper design of the internal magnetic path, attain both the desired ratio of external reluctance and internal reluctance necessary for stability, and the proper ratio of the magnetic spring constant to the mechanical spring constant for desired damping.

It is therefore another object of my invention to devise a transducing system having the relations of the internal to the external reluctance necessary for proper stability.

It is also an object of my invention to devise a transducing system wherein the magnetic spring constant bears such relation to the mechanical spring constant as to give desired electromagnetic damping and the internal reluctance bears such relation to the external reluctance so as to give desired stability to the system.

I have been able to devise a transducing system whereby the above criteria may be readily and conveniently attained by introducing in the internal magnetic path of a differential type of electromagnetic transducing system an additional reluctance in the form of an internal gap which is in series with the reluctance of the permanent magnet. This gap may be of such design that the reluctance of the gap and therefore the total internal reluctance does not change with the motion of the sprung mass. By adjusting the reluctance of the gap, as for instance, if it be one of constant area, by adjusting the length of the gap, I am able, with proper design of the remainder of the magnetic circuit, to obtain both a highly stable and adequately electromagnetically damped system. By making this internal gap adjustable in length I have found that a great flexibility in construction and an accurate adjustment of the system is possible.

It is therefore an object of my invention to devise a variable reluctance differential electromagnetic transducing system in whose internal magnetic circuit a gap is interposed.

It is an object of my invention to devise a variable reluctance differential electromagnetic transducing system in whose internal magnetic circuit is interposed a gap whose reluctance is in series with the reluctance of the permanent magnet.

It is an object of my invention to devise such a variable external reluctance differential electromagnetic transducing system in whose internal magnetic circuit is interposed a gap whose reluctance is constant while the external reluctance varies.

It is an object of my invention to devise such a variable reluctance differential electromagnetic transducing system in whose internal magnetic circuit is interposed an adjustable gap.

I have found that with proper design of the magnet circuit according to the criteria of this invention, this internal gap permits of the control and adjustment of the natural frequency of the system. I have found that the natural frequency of the electromagnetic transducing system is a function of the magnetic stiffness and that by adjusting the internal reluctance and therefore the ratio of the internal reluctances to the external reluctances, I can change this natural frequency of the system. I have found that by means of the adjustment of the adjustable gap of the system of my invention I can change the frequencies and at the same time maintain the stability and electromagnetic damping found desirable in my system.

It is therefore another object of my invention to devise a variable reluctance electromagnetic transducing system whose natural frequency may be varied by adjusting the internal reluctance of the system.

These and other objects of my invention will appear from the following more particular description of my invention, taken together with the appended drawings, of which:

Fig. 1 is a schematic illustration of a variable reluctance differential electromagnetic transducing system.

Fig. 2 is a schematic illustration of the magnetic circuit of Fig. 1.

Fig. 3 is a schematic illustration of the magnetic circuit of Fig. 4.

Fig. 4 is a schematic illustration of a constant internal gap variable reluctance differential electromagnetic transducing system.

Fig. 5 is a side view of an adjustable but constant internal gap variable external gap differential electromagnetic transducing system, with the case shown in section.

Fig. 6 shows the back view of the system shown in Fig. 5.

Fig. 7 is a view taken along line 10—10 of Fig. 5.

Fig. 8 is a view taken on line 11—11 of Fig. 5.

As has been previously stated, I have, by my invention, been able to greatly improve the sensitivity, damping and stability of variable reluctance electromagnetic transducing system.

(1) Sensitivity

Sensitivity may be defined as the ability to detect and respond faithfully to useful seismic disturbances. It may also be defined as the power output of the instrument for any given velocity of motion of the earth. Perhaps a more general definition of sensitivity is the magnitude of the power output per unit of mechanical energy input. Practically, a seismometer should be so sensitive as to generate an electric current of sufficient intensity for record purposes when energized by a ground motion of the minimum energy content which it is desired to detect.

(2) Damping

The system must be sufficiently damped so that successive seismic impulses can be individually recorded. The arrival of the seismic waves set both the case and inertial mass in vibration. In the absence of damping the inertial mass would continue to vibrate after the seismic waves have ceased arriving. The vibration of this mass and the characteristic of the generated current will become a complex of superimposed seismic disturbances and the individual characteristics of the successive waves will be so scrambled as to defy separation and detection. The ideal of damping is to have the inertial mass substantially at rest for each ground impulse. While this may not be achieved in practical operations, it would be desirable that the amplitude of the vibration of the mechanical system shall be reduced to a small value before the arrival of the succeeding seismic impulses.

In simple forms of such transducing system, in which a variable length constant area gap is employed wherein the vibrations induced in the sprung mass are translated by means of a varying flux to induce a correspondingly varying current in the coil, it is necessary that the oscillating system be damped, or such oscillations will continue for an undesirable length of time. This damping may be effected either mechanically, as by immersing the sprung vibrating mass in oil, or by electromagnetic means. Oil damping depends upon the dissipation of the energy of oscillation in viscous drag through the oil. The dissipation factor, also known as the decay factor, is dependent upon the viscosity of the oil. As is well known, the temperature coefficient of viscosity of oil, especially mineral oil, is large. Even for highly treated paraffinic oils of high "viscosity index," the temperature coefficient is large. Oil damping is therefore practical at best only in the laboratory where reasonably constant temperatures may be maintained. However, in field operations, especially in geophysical seismic prospecting, where the seismograph is exposed to sun and wind, the temperature may rise as much as 100° and fall as much as 40° to 50° below ordinary room temperature, and the design of an instrument for proper damping for room temperature will be entirely insufficient at the high temperatures to which it may be exposed. Oil damping is therefore not reliable. Electromagnetic damping is therefore resorted to.

Potential energy is stored in the springs of the transducing system by the motion of the sprung inertial reactor from rest position. For any degree of motion of this sprung mass, the potential energy stored in the spring will depend on the stiffness of the spring, being the greater as the spring is stiffer. The degree of damping depends upon the rate of dissipation of this potential energy. In an electromagnetic, variable reluctance type of instrument, this energy is converted in part into electrical energy and part into kinetic energy of the vibrating reactor. As this current is converted into heat energy it is dissipated at the expense of the potential energy of the spring. The remaining portion of the potential energy is consumed in the oscillation of the mass. The rate of dissipation of this energy will depend on the magnitude of the induced current since the magnitude of the energy absorbed due to heat is proportional to the square of the current, multiplied by the resistance, i. e. $RI^2$.

The magnitude of the induced current for any given velocity of motion of the inertial reactor depends on the flux through the coil at the time of initial motion of the reactor, i. e. upon the flux with the gap in the rest position, known as the rest gap. The degree of electromagnetic damping, i. e. the dissipation function of the vibration of the sprung mass, is a function of the ratio of the flux of the permanent magnet system of the instrument when the inertial reactor is at the rest position to the stiffness of the spring. In other words, for a given spring, the higher the flux through the gap at the rest position of the inertial mass, the greater will be the electromagnetic damping, and for the same flux through the gap at the rest position the greater will be the electromagnetic damping, the softer and less stiff is the suspension spring. Therefore, if the permanent magnet is made large enough we may obtain large enough flux to cause electromagnetic damping. But when this is accomplished the instrument becomes unstable.

(3) Stability

It is necessary, in order that the instrument function properly, that the spring restore the moving mass to rest position. If the flux of the permanent magnet is made large enough to exert the adequate damping force, it will be large enough when the gap is decreased as the inertial mass moves toward the pole pieces, to cause an attraction of the mass to the pole piece of the magnet. It will be found that this attractive force increases more rapidly as the inertial reactor approaches the pole face of the magnet than does the opposing restoring force of the bent spring. When the mass moves from rest it deflects the spring. The spring, according to Hook's law, creates a restoring force which varies linearly with the displacement from the rest position. On the other hand, the magnetic attractive force across the gap increases more rapidly than linearly. This attractive force varies inversely as the square of the sum of the reluctance of the gap and the other reluctances of the circuit. In a constant area, variable length gap, the reluctance of the gap is directly proportional to the length of the gap. It appears, therefore, that whereas the Hook's law restoring force increases directly as a first power of the diminution of the length of the gap, i. e. the displacement from rest, the opposing attracting force increases as a higher power of the diminution in length. It will be seen, therefore, that in such a system there will be a point of instability, i. e. a maximum displacement which, if exceeded by the vibrating mass, will move the mass against the restoring force of the spring to the face of the magnet and hold it there.

A transducing system such as a seismometer is subject to varying kinds of shock, both in its normal operation in detecting earth vibrations and also in ordinary movements of a seismometer in transportation and handling. It is essential that the permissible maximum displacement of the seismometer be sufficiently large so that the inertial reactor, even if moved to the pole piece, accidentally or due to excessive vibrations, will not stick to the pole piece. The permissible maximum displacement may be increased by increasing the stiffness of the spring, or by decreasing the value of the flux $\phi$. In either case the permissible maximum displacement will be moved further out, thus increasing the permissible displacement without sticking. If this means is taken to increase the permissible displacement without sticking, inevitably we obtain a decrease in the electromagnetic damping. As has been explained, the magnitude of such damping is a function of the ratio of the flux to the spring stiffness, and either the increase of the spring stiffness or the decrease in the flux in order to increase the stability will inevitably decrease the damping characteristics of the instrument.

Some advantage may be obtained by constructing the magnetic path of the seismometer in the form of a symmetrical differential magnetic path. Such a form is shown in Fig. 1. This form may be termed a differential variable reluctance electromagnetic transducing system. When employed as a seismometer, it may be termed a variable reluctance differential electromagnetic seismometer. In this form, as illustrated in that figure, 9 and 10 constitute an upper and lower armature which may be rigidly connected to the case 8. Between these armatures are suspended a permanent magnet 13 carrying pole pieces 14 and 15 and connected to the case 8 by springs 16. The armatures 9 and 10 are wound by complementary coils 11 and 12. It will be seen that when this seismometer is set in motion the inertial mass composed of the units 13, 14, and 15 is set in vibration vertically. On the upward motion of this mass the upper gaps 17 and 18 diminish while the lower gaps 19 and 20 increase. On the reverse motion, gaps 18 and 17 increase in length and the gaps 19 and 20 decrease in length. The magnetic material is made of a permanent magnet of high saturation value and having a high magnetomotive force. The masses 14 and 15 are made of high permeability material, fastened to the ends of the magnet for the purpose of conducting the magnetic flux to the gaps. The parts 9 and 10 are likewise made of high permeability metallic material for conducting the varying flux through the coils and inducing a potential across the terminals which will respond to the motion of the inertial mass. The current induced may be passed to a recording device as is conventional in this art, or it may be used for various purposes as indicated above, in which case the electrical circuit will be designed to perform the desired functions, as will be understood by those skilled in the art.

It will be seen that in this seismometer there is an axis of symmetry through the vertical center of the seismometer. The magnetic circuit of this seismometer may be represented in Fig. 2. In this figure the magneto-motive force of the magnet is represented at M. The reluctance of the magnet is represented at $R_1$. The variable reluctance of the upper gaps 17 and 18 is represented at $R_4$, and the variable reluctance of the lower gaps 19 and 20 is represented as $R_5$. The reluctances of the return paths carrying the coils are represented as $R_2$ and $R_3$. $\phi$ is the resultant flux in the direction of the arrow. It will be observed that the reluctance $R_4$ is in series with $R_2$ and $R_5$ is in series with $R_3$, and that the branches composed of $R_4$ and $R_2$ and the branch composed of $R_3$ and $R_5$, and the branch composed of $R_1$ are all in parallel.

In this circuit, the reluctance of the permanent magnet 13, that is, that part of the permanent magnet circuit composed of element 13 and represented by the reluctance $R_1$, is termed the internal magnetic path, or the internal reluctance of the seismometer. The paths of the seismometer composed of the masses 14 and 15, gaps 17 and 18, armatures 9 and 10, gaps 19 and 20 are termed the external magnetic paths of the seismometer, and the reluctances of such paths are termed the external reluctances of the seismometer. It will be observed that the internal reluctance of the system remains constant during the displacement of the sprung mass. The system may therefore be termed a constant internal reluctance variable external reluctance differential electromagnetic transducing system.

These air gaps are essentially plane and parallel faces of equal area and their length is small relative to the smallest width of their face. Because the specific reluctivity of air may be taken as substantially unity, the reluctance of the gaps can, with sufficient accuracy, be considered to be equal to the ratio of the gap length to the area.

If we write $R_g$ to be the reluctance of each of the gaps $R_4$ and $R_5$ when the inertial reactor is in center position, that is, when the masses 14 and 15 are at rest, and L to be the length of the rest gaps, that is, the length of the gaps when the inertial mass is at rest, we may write $$R_4 = R_s\left(1 - \frac{x}{L}\right) \quad \text{(Equation 1)}$$

$$R_5 = R_s\left(1 + \frac{x}{L}\right) \quad \text{(Equation 2)}$$

where $x$ is the displacement from the center position in the direction of the decreasing reluctance of $R_4$ and therefore of the increasing reluctance of $R_5$. The co-ordinate of displacement $x$ is measured from the rest position which is taken as zero.

Motions of the masses 14 and 15 away from rest and towards armature 9 which results in decreasing values of the reluctance $R_4$ are measured as positive. Motions of the masses 14 and 15 away from rest and towards the armature 10 which results in decreasing values of the reluctance $R_5$ are measured as negative.

It will be observed in this connection, that the attractive forces across the upper gaps 17 and 18 are balanced by opposing attractive forces across the lower gaps 19 and 20. During the upward motion of the elements 14 and 15 the restoring force of the springs 16 is aided by the attractive forces across the gaps 19 and 20. The magnetic attractive forces across the gaps whose length is increasing during the motion of the inertial mass, therefore, may be viewed as supplementing the restoring force of the springs. It may be considered as equivalent to additional stiffness in the springs 16. In this way these opposing gaps aid in damping of the instrument without changing the stiffness of the springs.

However, while aiding in damping, like the single gap and single path instrument, the inherent characteristics of the magnetic circuits impose a severe limitation upon the amount of damping which may be obtained. As the inertial reactor moves to decrease the upper gap and therefore decrease its reluctance, there is a complementary variation in the lower gap, in which the same result in the opposite direction occurs. As the length of the upper air gap decreases, the length of the lower gap equally increases. As the reluctance of the upper gap decreases, the reluctance of the lower gap equally increases. As the flux across the upper gap increases, the flux in the lower gap decreases. As has been herein explained, the attractive force across the upper gap increases as the square of the increase in flux and the opposing restoring magnetic attractive force in the lower gap will decrease at the same rate. The net effect of this addition of the lower gaps is that while they permit of the employment of less stiff springs, by themselves they are not sufficient to permit electromagnetic damping without encountering the inherent instability, i. e. sticking of the instrument.

The magnetic stiffness of the instrument may be defined as the rate of increase of the magnetic force in the direction away from rest per unit of motion of the inertial reactor. Or, stated in another way, it is the rate of increase of the magnetic attractive force across the gap per unit of motion of the displaced mass.

$S_{mag.}$, the magnetic stiffness is defined as $$S_{mag.} = \frac{M^2 R_s^2}{8\pi L^2 (R_s+R_s)\left\{R_1 + \frac{R_s+R_s}{2}\left[1 - \left(\frac{R_s}{R_s+R_s}\right)^2 \left(\frac{x}{L}\right)^2\right]\right\}^2}$$

(Equation 3)

In this formula the equal reluctances $R_2$ and $R_3$ when the inertial reactor is at rest are designated by $R_s$.

The net force $F$ is the difference between the mechanical and the electromagnetic force, $$F = F_{mech.} - F_{mag.} \quad \text{(Equation 4)}$$

and therefore $$F = S_x - S_{mag.}\cdot x \quad \text{(Equation 5)}$$

If the value of $S_x$ is greater than $S_{mag.}x$, the net force is positive, that is, in the direction of restoring the inertial mass to rest position. If the value of $S_{mag.}x$ is greater than $S_x$, then the force will be away from rest position and cause sticking.

It will be observed that the factors which compose and control the magnetic stiffness are M, the magneto-motive force of the permanent magnet, the reluctance of the rest gap, the reluctance of the armature, and the reluctance of the magnet and the length of the gap. By controlling these factors, all of which I may do by proper choice of the composition of the magnets and degree of magnetization and the permeability of the return paths, and the length and area of the gap, I may control the degree of magnetic stiffness. The stiffness of the spring metal is usually known or can be readily determined experimentally.

The magnetic stiffness for small values of the displacement $x$, in which the ratio $x/L$ is so small as to permit one to neglect the term $$\left(\frac{R_s}{R_s+R_s}\cdot\frac{x}{L}\right)^2$$

may be written as:

$$S'_{mag.} = \frac{M^2 R_s^2}{8\pi L^2 (R_s+R_s)\left(R_1 + \frac{R_s+R_s}{2}\right)^2} \quad \text{(Equation 6)}$$

In measuring seismic disturbances the degree of motion will be in this range of the values $x/L$.

For convenience I denominate the $S_{mag.}$, i. e. the magnetic stiffness in the regions where it is substantially a constant as the magnetic stiffness constant, and give to it the symbol $S'_{mag.}$ I have found that in order to obtain satisfactory electromagnetic damping it is desirable to design the instrument so that magnetic stiffness constant $S'_{mag.}$ should be greater than about two-thirds of the mechanical stiffness.

$$S'_{mag.} \geq \tfrac{2}{3} S \quad \text{(Equation 7)}$$

This is particularly true where the load on the electrical circuit is substantially a resistance load as is usual in this form of instrument. When such relationship is obtained, while we do not get a critically damped instrument, the degree of damping, that is, the fraction of critical damping which is obtained, is sufficiently high for practical purposes. This desirable electromagnetic damping will then be obtained not only in the region of small displacements, but also throughout the motion, i. e. for all possible displacements of the inertial mass. As the value $S'_{mag.}$ moves from two-thirds toward that of equality, we approach more closely a critically damped instrument. By setting the magnetic stiffness substantially equal to the mechanical stiffness constant, we obtain a critically damped instrument. The instrument is then also unstable in that any small displacement of the inertial mass will result in an unbalanced force which will move the mass away from rest to the pole piece of the armature. As the magnetic stiffness constant departs from this relationship to a smaller fraction of the spring stiffness, we move into the region of insufficient electromagnetic damping. When $S'_{mag.}$ is zero, we have no electromagnetic damping. It is not desirable to set this value of the magnetic stiffness too close to the region of critical damping, since in so doing the instrument becomes unstable, as explained above.

Although some degree of electromagnetic damping is obtainable for all values of the magnetic stiffness and magnetic stiffness constant, I have found that the most desirable and practical degree of electromagnetic damping is obtained by a design of the instrument in which the magnetic stiffness constant should be preferably more than about two-thirds of the mechanical stiffness, and should be less than the mechanical stiffness.

I have found that it is desirable to maintain the magnetic stiffness from about two-thirds to a value sufficiently large so as to give practical and desirable damping without causing the instrument to become unstable. For many seismometers, it will be found that an upper limit of about four-fifths will give such desirable results. Above this value the instrument will approach critical damping and instability.

In order to obtain the desirable stability when setting the ratio of the magnetic to mechanical stiffness, for desirable electromagnetic damping, I have found that the external and internal reluctance must be carefully controlled. We may write the desirable value of the ratio $S'_{mag.}/S$ as $K_1$ and the desirable value of the ratio of reluctance $R_1/R_s+R_g$ as $K_2$.

I have found, in order to obtain the desired stability, that these constants should preferably satisfy the following relationship:

$$K_2 \geq \frac{\sqrt{K_1}}{2(1-\sqrt{K_1})} \qquad \text{(Equation 8)}$$

Thus for any value of $K_1$ (preferably greater than two-thirds) the value of $K_2$ should be equal to or greater than $$\frac{\sqrt{K_1}}{2(1-\sqrt{K_1})}$$

Thus for a value of $K_1$ equal to two-thirds, the value of $K_2$ should be equal to or greater than about 2.2.

I have found that if the internal reluctance $R_1$ of the permanent magnet is proportioned to the external reluctance $(R_s+R_g)$ as given by the above relationship, I am able to obtain the necessary stability when employing the above ratios of magnetic to mechanical stiffness.

I have discovered that if this relationship is obtained or exceeded, the net force acting on the reactor will always be in the direction of the rest position. As will be seen from Equation 13, the magnetic stiffness may be also expressed by the following equation:

$$S_{mag.} = \frac{M^2 R_e^2}{8\pi L^2 (R_s+R_g)^3 \left\{ \frac{R_1}{R_s+R_g} + \frac{1}{2}\left[1-\left(\frac{R_e}{R_s+R_g}\right)^2 \left(\frac{x}{L}\right)^2\right]\right\}^2}$$

(Equation 9)

From the above equation it will appear that for any displacement $x$ the magnetic stiffness will be the less the greater is the ratio of the internal to the external reluctance, i. e. $R_1/(R_s+R_g)$. With such diminished magnetic stiffness, the magnetic force tending to move the inertial reactor from rest position will be less.

If the value of $K_2$ is less than the value as given above, for any value of $K_1$, then the point P will be within the gap and sticking will occur if the deflection of the inertial mass passes beyond such point.

There are, however, a number of complicating factors which must be taken into consideration in the practical design of the instrument and in the setting of this ratio.

One of the important considerations is that of leakage fluxes. These leakage fluxes decrease the flux in the air gap and act to increase the curvature of the magnetic force line, i. e. they act in the direction of instability.

Thus, when the value K is two-thirds, the value of $K_2$ is about 2.2 and we may write in such case the relationship as follows:

$$R_1 > 2.2(R_s+R_g) \qquad \text{(Equation 10)}$$

Since in the form of the seismometer of Figs. 1 and 4, the total external reluctance is given by $$\frac{R_s+R_g}{2}$$

therefore this value may be set in terms of the total reluctance as twice the value in terms of the reluctances $R_s+R_g$, one branch of the external reluctance.

A further element is introduced by the mechanical imperfections of the surfaces of the gap. Machining never leaves a perfectly flat surface and there are minute high points on the surface. Flux concentrates in these high points and when the faces approach very close together the attractive force is greater than would be present if the surfaces were absolutely plane and parallel. In a practical design the armature and the inertial mass are made of laminations. The gap surfaces are therefore composed of ridges. I have found that the effect of this leakage flux is taken care of for all practical purposes by increasing the value of the ratio of $R_1$ to $R_s+R_g$ beyond that set by the Equation 10 by a factor of safety whose magnitude will depend on the accuracy of construction and design to reduce such leakage fluxes and imperfections in the construction of the gap. In a well designed instrument in which conventional precautions are taken to reduce leakage fluxes, a desideratum in all designs of transducing systems, and with the usual care in machining and construction to be expected of all instrument makers, I have found that a factor of safety of two is all that is necessary. When observing the above relationships of stiffnesses and reluctances, if the ratio of $R_1$ to $R_s+R_g$ is as below, $$R_1 = 4.4(R_s+R_g) \qquad \text{(Equation 11)}$$

I have been able to obtain excellent electromagnetic damping, sensitivity and stability. The instability occasioned by the imperfections of the magnetic construction of the gap may be overcome by means of stops which will not permit the gap to close to such a degree as to cause these imperfections to result in sticking. I have been able to so design the instrument as to permit the surfaces to approach with but minute separation, using merely a strip of Cellophane to separate the surfaces. It will be seen that within the range of the refinement of instrument construction, the instrument has an exceedingly high stability and will not stick.

The desired relationship of the reluctances may be obtained by proper design of the permanent magnet, i. e. as to choice of magnetic material and dimensions, and the external magnetic paths to dimensions and choice of material, and by proper design of the gaps.

It is possible to design an instrument to obtain the desirable relationships of the reluctances, as herein explained, merely by designing the shape of the permanent magnet and the gaps and by the proper choice of materials of desirable reluctance to obtain an instrument having the desired ratio of internal and external reluctances. I have found that a convenient method of obtaining this ratio is by the introduction of an internal gap in series with the reluctance of the permanent magnet. This will increase the reluctance of the internal magnet path without changing the flux through the magnet, thus permitting it to be at a high magneto-motive force. This will permit the use of high internal reluctance for a given desired flux and therefore assist in obtaining the desired relation of external to internal reluctance.

Such an instrument is schematically illustrated in Fig. 4, and is similar to the forms shown in Fig. 1 in that it is a variable reluctance differential electromagnetic transducing system or seismometer. The magnetic circuit of this instrument is shown at Fig. 3. In Fig. 4, 21 is a permanent magnet of high saturation value magnetically and rigidly connected to the external return paths of the armature of the pole pieces 22 and 23, which are of high permeability, and are wound with coils 24 and 25. The inertial mass 26 is hung on springs 27 in such manner as to present an internal gap 28 and two external gaps 29 and 30. In the magnetic circuit Fig. 3, which is similar to Fig. 2, M represents the magneto-motive force of the permanent magnet, $R_1$ the reluctance of this permanent magnet, $R_6$ the reluctance of the series gap, $R_4$ and $R_5$ the reluctances of the variable gaps plus the reluctance of the corresponding portions of the inertial mass 26, and $R_2$ and $R_3$ are the reluctances of the external armature return paths, and $\phi$ is the flux in the direction of the arrow. The portion of the magnetic circuit corresponding to the reluctances $R_1$ of the permanent magnet 21, and $R_6$ of the internal gap 28, is termed the internal reluctance of the seismometer. The reluctance $R_4$ and $R_5$ of the external gaps 29 and 30 and corresponding portions of the inertial reactor, and $R_2$ and $R_3$, the return paths of the armature coils 22 and 23, are termed the external reluctances of the instrument. The external magnetic circuit is composed of inertial reactor 26, gap 30, armature 22, and also inertial reactor 26, gap 29, and armature 23. The internal magnetic circuit is composed of the gap 28 and magnet 21.

Figs. 5, 6, 7 and 8 illustrate the construction of the instrument. Fig. 5 is a left-hand side view of the instrument with the case shown in section. Fig. 6 is the rear view of the instrument with the case shown in section. Fig. 7 is a section taken along line 10—10 of Fig. 5, and Fig. 8 is a section taken along line 11—11 of Fig. 5.

The cylindrical case 31 is closed by a screw top 32 carrying a boss 33 through which is passed a cable 34. The instrument is positioned inside the case and is composed of a permanent magnet 35 preferably made of metal highly magnetized. This magnet corresponds to 21 of Fig. 4. The return magnetic path is composed of L-shaped laminations which correspond to return paths 22 and 23 of Fig. 4. These L-shaped laminations have a base 37 and 39 and arms 36 and 38. The laminations and the magnet are held between two generally E-shaped holding castings made of aluminum, shown at 40 and 41, made up of a base 42 and 43 and upper arms 44 and 46, lower arms 45 and 47 and center arms 48 and 49. The upper arms 44 and 46 hold the laminated arm 36 clamped between them by means of bolt 50. The lower arms 45 and 47 hold the lower laminated arm 38 by means of bolt 51. The laminated bases 37 and 39 are clamped between the bases 42 and 43 of the castings by bolts 52 and 53. The permanent magnet which abuts the laminated bases 37 and 39 is clamped between the center arms 48 and 49 by means of the bolts 54. The arms 36 and 38 carry coils 55 and 56 which are suitably insulated from the rest of the instrument.

The inertial mass which corresponds to the mass 26 in Fig. 4, is composed of a laminated block 61 held between castings 62 and 63 which are backed up by plates 64 and 65. The assembly is held by bolts 66 and 67. In the base of the blocks 42 and 43 are positioned four trapezoidal grooves 59. In these grooves are wedge blocks 57, held in the grooves by bolts 58. Between these blocks and the face of the groove are clamped four flat springs 60 which correspond to the springs 27 in Fig. 4. These springs are attached to the inertial mass by means of plates 68 by bolts 69. The inertial mass assembly is positioned on these springs to present an upper gap 70 between the upper face of the laminations 61 and the blocks 62 and 63 and the lower face of the laminated arm 36, and to present a lower gap 71 between the lower face of the laminated block 61 and the clamping blocks 62 and 63 and the upper face of the laminated arm 38. It presents a gap 72 between the back of the inertial mass assembly, i. e. the laminated block 61 and the backing blocks 62 and 63 and the front face of the permanent magnet assembly, composed of the magnet 35 and the arms 48 and 49. An insulating plate 73 is attached to the upper arms 44 and 46 and to the lower arms 45 and 47 by means of screws 74. The whole assembly is attached to the closure by means of bolts 75 and 76. The cable 34 is connected to any desired recording unit or the current may be employed in any desired way as previously indicated.

After the instrument is assembled, and before introducing it into the case, a heavy conductor is passed and wrapped around the magnet and a large current is passed through the conductor to magnetize the permanent magnet substantially to its saturation value.

It will be seen that as this inertial mass is set in vibration the upper and lower gaps will vary, but that the gap 72 will remain constant. The edges of the laminations of 37, 39 and 61 in gap 72 are parallel to each other and the opposed faces of gap 72 are substantially plane and parallel. The length and area of the gap 72 are therefore sensibly constant during motion of mass 61. By loosening screws 58 the wedge blocks 57 may be loosened and the springs 60 and consequently the inertial mass may be moved horizontally to enlarge or diminish the length of the gap 72. By tightening the screws 58 the springs are then clamped in place to give the desired gap spacing at 72.

The gap is adjusted as described to give the relationship of external to internal reluctances as previously described. The reluctance of the internal gap is set so that the value of $K_2$ for the value $K_1$ of the particular instrument shall be at least as great as that shown by Equation 8. The instrument is so designed and constructed that the value of the constant $K_1$ shall be at least as great as two-thirds and therefore the sum of the internal reluctance $R_1+R_6$ is set to be greater than 2.2 times the external reluctance of one of the external branches of the magnetic circuit, or as previously explained, 4.4 times the total external reluctance. In view of the desirability of introducing a safety factor, as previously described, this setting of the internal gap is set so that the above values of 2.2 or 4.4 are multiplied by two. With a properly designed instrument as described herein, this setting of the reluctances can be obtained by observing the natural frequencies of the instrument.

The natural frequency of the suspended mass is first determined by assembling the instrument with the magnet in place but with the magnet in a very weakly magnetized or in the unmagnetized state. The natural frequency of vibration of this instrument is then determined by setting the inertial reactor into vibration and measuring the frequency of oscillation by means of a vibration detector. Such methods of determining the natural frequency of suspended masses are well known.

The natural frequency $f_0$ of the instrument with the magnet in a weakly magnetized state or unmagnetized, is related to the mass of the inertial reactor and the spring constant by the following relationship:

$$f_0 = \frac{1}{2\pi}\sqrt{\frac{S}{m}} \quad \text{(Equation 12)}$$

The instrument is then magnetized as described above and the frequency of the instrument in the magnetized state is then determined in like manner. In making this frequency determination, care must be taken to deflect the mass only a small distance from rest, this distance being substantially less than the length of the gap. The purpose of this precaution is to insure that the deflection of the spring shall be in the region where the force necessary to deflect the mass is a linear function of the displacement. As is well known, if such displacements are too large, the frequency of vibration becomes a complicated function of the displacement and is not the natural frequency of the instrument. The frequency in the magnetized state is expressed as $f_m$, and this frequency is related to the mechanical stiffness S and the magnetic stiffness constant $S'_{mag}$ and the mass $m$ by the following equation:

$$f_m = \frac{1}{2\pi}\sqrt{\frac{S-S'_{mag}}{m}} \quad \text{(Equation 13)}$$

From the above relationships it appears that $$\frac{S'_{mag}}{S} = 1 - \left(\frac{f_m}{f_0}\right)^2 \quad \text{(Equation 14)}$$

Having designed and constructed the instrument with the criteria above described, it will be found that at these ratios of the mechanical stiffness and the magnetic stiffness, and with the proper setting of the internal gap, the relationships of the external to the internal reluctance will meet the criteria previously described.

We can thus obtain, within a wide latitude of designs of the magnetic paths, a seismometer of the desired ratio of internal to external reluctance and of the desired ratio of mechanical to magnetic stiffness, by adjusting the length of the internal gap.

As has been previously explained, due to the imperfections in machining and due to unavoidable leakage fluxes, it may occur that even with such adjustment of internal and external reluctances, the inertial reactor, when approaching very close to the opposing faces of the armatures, will enter into a region of abnormal flux distribution and flux density, and some accidental sticking will occur. It is therefore desirable, as a precaution and a safety measure, to interpose a stop to prevent the inertial reactor actually contacting the opposing faces of the armature pole pieces. I have found it sufficient to merely paste a piece of Cellophane on the lower and upper faces of the laminated armatures 36 and 38. This has been sufficient to overcome the imperfections of machining and designing which are unavoidable in any practical construction.

The internal gap also introduces another element of flexibility which is highly desirable. By means of this internal gap, we may control the natural frequency of the instrument. The natural frequency $f_m$ of the seismometer is a function of the mechanical stiffness and the magnetic stiffness as previously described.

As was explained (see Equation 13 and Equation 9), the natural frequency in the magnetized instrument depends on the magnetic stiffness, which in turn depends on the internal reluctance, which is adjusted as previously described. The natural frequency of the magnetized instrument may be adjusted by adjusting the internal gap. These frequencies, as previously described, should, however, conform to the criteria and relationships of the magnetic stiffness, mechanical stiffness and to the internal and external reluctances.

This improvement results in an important feature of the instrument in that by reason of the adjustability of the length of the gap this frequency may be altered, as previously described. This frequency alteration is accomplished without disturbing the permanent magnetism by means of a simple adjustment which may be made in the field. This is particularly important where such instruments are used in seismic prospecting for determining the subsurface formations, a method which is in general use in oil field exploration. In such operations a number of seismographs are used to record the arrival of the ground impulses at various locations. In such a set-up, as many as eight seismometers are used for each channel to obtain one trace, and as many as forty channels are employed. It is of prime importance that all of the seismometers of a group used for seismic recording have an identical response for the same applied transient ground vibration. This means that they should have substantially identical frequencies. To obtain this rigorous requirement has in the past imposed extreme demands upon the permissible variations in magnetic characteristics of the materials and design of the elements employed in the construction, especially when instruments of high sensitivity and consequently large magnetization are desired. It imposes extremely narrow tolerances upon machining and construction of the instruments, in order that all the instruments be absolutely uniform. But even when all this nicety of design and construction is obtained, the disturbing effect of temperature in the field has made it extremely difficult, no matter how carefully and identically all instruments are designed, to obtain the desired uniformity in response when they are used under actual field conditions. This is especially true in the case of oil damped seismometers.

The adjustable internal gap 72 permits of adjustment of this natural frequency and frequency response and the damping characteristics to obain uniformity of the various seismometers, and permits of a greater latitude in the design and construction. This results in the simplification and the cheapening of the cost of construction of the instruments.

I have, by means of this internal gap, been able to develop a transducing system which has high sensitivity and stability with high electromagnetic damping. This instrument has an adjustable frequency response because its natural frequency is adjustable. I have been able to obtain these advantages by reason of my discovery that by designing the ratio of magnetic stiffness constant to the mechanical stiffness to be preferably in excess of about two-thirds, and by adjusting the internal reluctance of the seismometer so that the ratio of internal to total external reluctance be greater than 4.4 and preferably higher than 8.8, a seismometer having these advantages results. This may be accomplished by providing an internal gap whose reluctance can be adjusted, but is constant and independent of displacement.

In the above discussion of the effect of the ratio of magnetic stiffness and mechanical stiffness upon the damping characteristics, and of the effect of internal and external reluctance upon stability, the internal reluctance was sensibly constant throughout the displacement of the inertial mass. In the variable reluctance differential electromagnetic system, Fig. 1, of course, no change of the internal reluctance of the system is occasioned due to oscillation of the unit 14, 13, 15, and in the form Figs. 4 to 8 inclusive, the internal gap being constant during the displacement of the inertial reactor, the internal reluctance is a constant.

It is to be understood that the embodiments of my invention shown and described are intended to be illustrative of the invention, and not limiting, and modifications may be made therein without departing from the spirit of the appended claims.

I claim:

1. In a variable reluctance differential electromagnetic transducing system, a permanent magnet comprising laminations, assembled to form a rectangular block, a pair of clamping blocks to hold said laminations, a mass comprising a rectangular block of laminations of high magnetic permeability, clamping plates for said laminations, said rectangular mass being spaced from said permanent magnet to present a gap between the substantially plane face of the rectangular block forming said permanent magnet and the substantially plane face of said block mass, a pair of return magnetic paths composed of laminated blocks of highly permeable material, means for rigidly connecting said return paths parallel to said permanent magnet, each of said return paths extending beyond said permanent magnet, said mass being mounted between said return paths and so spaced from each of said return paths to present a gap between one end of said block mass and one of said return paths and another gap between the other end of said block mass and the other of said return paths, a plurality of springs connected to said block mass and to said assembly of said permanent magnet and said return paths, coils in said return paths.

2. In a variable reluctance differential electromagnetic transducing system, a permanent magnet comprising laminations, assembled to form a rectangular block, a pair of clamping blocks to hold said laminations, a mass comprising a rectangular block of laminations of high magnetic permeability, clamping plates for said laminations, said rectangular mass being spaced from said permanent magnet to present a gap between the substantially plane face of the rectangular block forming said permanent magnet and the substantially plane face of said block mass, a pair of return magnetic paths composed of laminated blocks of highly permeable material, means for rigidly connecting said return paths parallel to said permanent magnet, each of said return paths extending beyond said permanent magnet, said mass being mounted between said return paths and so spaced from each of said return paths to present a gap between one end of said block mass and one of said return paths and another gap between the other end of said block mass and the other of said return paths, a plurality of springs, said block mass being mounted on said springs, said springs being also adjustably mounted on said assembly of said permanent magnet and said return paths, coils in said return paths.

3. In a variable reluctance differential electromagnetic transducing system, a permanent magnet in the form of a rectangular block, a mass comprising a rectangular block of high magnetic permeability, said rectangular mass being spaced from said permanent magnet to present a gap between the substantially plane face of said rectangular block forming said permanent magnet and the substantially plane face of said block mass, a pair of return magnetic paths composed of highly permeable material, means for rigidly connecting said return paths parallel to said permanent magnet, each of said return paths extending beyond said permanent magnet, said mass being mounted between said return paths and so spaced from each of said return paths to present a gap between one end of said block mass and one of said return paths, and another gap between the other end of said block mass and the other of said return paths, a plurality of springs connected to said block mass and to said assembly of said permanent magnet and said return paths, coils on said return paths.

4. In a variable reluctance differential electromagnetic transducing system, a permanent magnet in the form of a rectangular block, a mass comprising a rectangular block of high magnetic permeability, said rectangular mass being spaced from said permanent magnet to present a gap between the substantially plane face of said rectangular block forming said permanent magnet and the substantially plane face of said block mass, a pair of return magnetic paths composed of highly permeable material, means for rigidly connecting said return paths parallel to said permanent magnet, each of said return paths extending beyond said permanent magnet, said mass being mounted between said return paths and so spaced from each of said return paths to present a gap between one end of said block mass and one of said return paths, and another gap between the other end of said block mass and the other of said return paths, a plurality of springs, said block mass being mounted on said springs, said springs being also adjustably mounted on said assembly of said permanent magnet and said return paths.

5. In a variable reluctance differential electromagnetic transducing system, a permanent magnet comprising laminations, assembled to form a rectangular block, a pair of clamping blocks to hold said laminations, a mass comprising a rectangular block of laminations of high magnetic permeability, clamping plates for said laminations, said rectangular mass being spaced from said permanent magnet to present a gap between the substantially plane face of the rectangular block forming said permanent magnet and the substantially plane face of said block mass, a pair of return magnetic paths composed of laminated blocks of highly permeable material, means for rigidly connecting said return paths in position parallel to said permanent magnet, each of said return paths extending beyond said permanent magnet, said mass being mounted between said return paths and so spaced from each of said return paths to present a gap between one end of said block mass and one of said return paths and another gap between the other end of said block mass and the other of said return paths, a plurality of springs, adjustably clamped to said block mass, a plurality of trapezoidal slots in said means for connecting said return paths to said permanent magnet, a plurality of wedge-shaped blocks slidably positioned for clamping in said trapezoidal slots, said springs being adjustably gripped by said wedges in said slots, coils in said return paths.

RUSSELL W. RAITT.

REFERENCES CITED

The following references are of record in the file of this patent:

UNITED STATES PATENTS

| Number | Name | Date |
|---|---|---|
| 2,111,643 | Salvatori | Mar. 22, 1938 |
| 1,709,571 | Harrison | Apr. 16, 1929 |
| 1,773,082 | Harrison | Aug. 12, 1930 |
| 1,942,740 | Applegate | Jan. 9, 1934 |
| 1,602,824 | Jones | Oct. 12, 1926 |
| 2,311,079 | Parr | Feb. 16, 1943 |
| 2,303,413 | Washburn | Dec. 1, 1942 |

OTHER REFERENCES

"The Electromechanical Transducer in the New Benioff Seismograph," by James J. Devlin. Bulletin of the Seismological Society in America, vol. 28 (1938), pages 255–258, inclusive.